(12) United States Patent
Kobayashi

(10) Patent No.: US 6,647,827 B2
(45) Date of Patent: Nov. 18, 2003

(54) LIGHTWEIGHT WAVE GEAR DRIVE

(75) Inventor: Masaru Kobayashi, Nagano-ken (JP)

(73) Assignee: Harmonic Drive Systems, Inc., Tokyo (JP)

(*) Notice: Subject to any disclaimer, the term of this patent is extended or adjusted under 35 U.S.C. 154(b) by 0 days.

(21) Appl. No.: 10/141,924

(22) Filed: May 10, 2002

(65) Prior Publication Data

US 2002/0184967 A1 Dec. 12, 2002

(30) Foreign Application Priority Data

May 10, 2001 (JP) .................................. 2001-139449

(51) Int. Cl.[7] .................. F16H 33/00; F16H 35/00; F16H 37/00
(52) U.S. Cl. .................................. 74/640; 29/893.3
(58) Field of Search .................. 74/640, 650, 606 A; 29/898.63, 898.6, 893.31–893.35, 893.3

(56) References Cited

U.S. PATENT DOCUMENTS 5,720,101 A * 2/1998 Foley et al. ............... 29/893.3

FOREIGN PATENT DOCUMENTS

| JP | 60091044 A | * 5/1985 | ............ F16H/1/32 |
| JP | 07004476 A | * 1/1995 | ............ F16H/1/32 |
| JP | 10-318338 | 12/1998 | |
| SU | 1754986 A | * 8/1992 | ............ F16H/1/00 |

OTHER PUBLICATIONS

U.S. publication to Kobayashi et al, published Dec. 12, 2002.*
U.S. publication to Kobayashi et al, Nov. 28, 2002.*

* cited by examiner

Primary Examiner—Sherry Estremsky
Assistant Examiner—Tisha D. Lewis
(74) Attorney, Agent, or Firm—Burns, Doane, Swecker & Mathis, L.L.P.

(57) ABSTRACT

A wave gear drive has a wave generator with a hub and rigid cam plate formed of titanium alloy. Heat-dissipating fins are provided on both sides of these parts, and heat-dissipation is further increased by plating the surfaces with a material having a higher coefficient of thermal conductivity than that of titanium alloy. The result is a lightweight wave gear drive having good heat-dissipating properties that uses titanium alloy, which is stronger and more rigid than aluminum alloy.

6 Claims, 3 Drawing Sheets

LIGHTWEIGHT WAVE GEAR DRIVE

This application claims priority under 35 U.S.C. §§119 and/or 365 to JP2001-139449 filed in Japan on May 10 2001; the entire content of which is hereby incorporated by reference.

BACKGROUND OF THE INVENTION

1. Field of the Invention

The present invention relates to a lightweight wave gear drive equipped with a lightweight wave generator.

2. Description of the Prior Art

Reduction gears used in mechanisms for driving robots and the like include a wave gear drive that is manufactured and sold by the present inventors under the proprietary name "harmonic drive." A typical wave gear drive comprises a rigid, circular internal gear, a flexible, circular external gear disposed within the internal gear, and a wave generator. The wave generator comprises a rigid, elliptical wave-plug and a wave bearing on the outer periphery of the wave-plug. Thereby, the flexible external gear is flexed into an elliptical shape, causing the toothed portions of the flexible external gear at each end of the elliptical major-axis to mesh with the corresponding teeth of the rigid internal gear. When the wave generator is rotated by a motor, the positions at which the two gears mesh move around the circumference, generating a relative rotation arising from the difference in the number of teeth. Generally, the difference in the number of teeth in the two gears is two; with the internal gear being attached to a drive housing, the rotational output from the motor is taken off the external gear, with the rotational speed being greatly reduced by the difference in the number of teeth.

The present inventors have proposed reducing the weight of the wave gear drive thus configured by manufacturing the rigid internal gear and wave generator of a lightweight metal such as aluminum alloy. This is disclosed in, for example, JP-A Hei-10-318338.

When aluminum alloy is used to manufacture the wave gear drive to reduce the weight of the drive, aluminum alloy has good heat dissipation properties, so there is no problem in that regard. However, although titanium alloy is harder and stronger than aluminum alloy, it is not practical to manufacture a wave gear drive using titanium alloy because of its poor heat dissipation properties. Because the wave generator, in particular, is rotated at a high speed by the motor, the frictional contact portions of the wave bearing and the frictional contact portions between the wave generator and the external gear form the biggest source of heat in the wave gear drive. Therefore, if the hub and rigid cam-plate constituting the wave-plug of the wave generator are made of titanium alloy, they overheat and seize up.

An object of the present invention is to provide a wave gear drive having good heat dissipation properties that is provided with a wave generator formed of titanium alloy.

SUMMARY OF THE INVENTION

To attain the above and other objects, the present invention provides a lightweight wave gear drive comprising a rigid, circular internal gear, a flexible, circular external gear, and a wave generator that radially flexes the external gear into partial engagement with the internal gear and moves the position of engagement of the two gears in a circumferential direction, the wave generator including a circular hub, a rigid cam plate formed around an outer periphery of the hub, and a wave bearing provided between an outer peripheral surface of the rigid cam plate and an inner peripheral surface of the external gear, wherein, of the hub and the rigid cam plate, at least the rigid cam plate is formed of titanium alloy, and at least a portion of two sides of the rigid cam plate is formed as a crenellated heat-dissipating surface.

The wave generator, namely its rigid cam plate is the input element that is rotated at a high speed, so heat-dissipation can be improved by forming this portion as a crenellated heat-dissipating surface.

The heat-dissipating surface can be comprised by forming radial heat-dissipating fins. Also the hub and the rigid cam plate can be formed of titanium alloy as a single component.

It is desirable to plate the rigid cam plate surface with a heat-dissipating coating of a material such as copper having a higher coefficient of thermal conductivity than titanium alloy. Plating the surface of the titanium alloy, which does not have good thermal conductivity, with a metal having good thermal conductivity helps to increase the thermal diffusion and thus improve the rate at which heat is dissipated by contact parts.

The surface plating can have a thickness within the range of from five to fifty micrometers.

It is desirable to subject the surface of the rigid cam plate that is to be plated to surface hardening by shot peening. This makes it possible to increase the surface area of the rigid cam plate, thereby promoting heat dissipation.

In the lightweight wave gear drive of this invention, a heat-dissipating surface is formed on the rigid cam plate of the wave generator, which is the biggest source of heat. The wave generator rotates at high speed, so increasing the efficiency with which heat is radiated by this part makes it possible to prevent overheating. It is preferable to further enhance the heat dissipation properties by plating the part with a material such as copper having good heat-dissipating properties.

Further features of the invention, its nature and various advantages will be more apparent from the accompanying drawings and following detailed description of the invention.

DESCRIPTION OF THE PREFERRED EMBODIMENT

Figure 1:
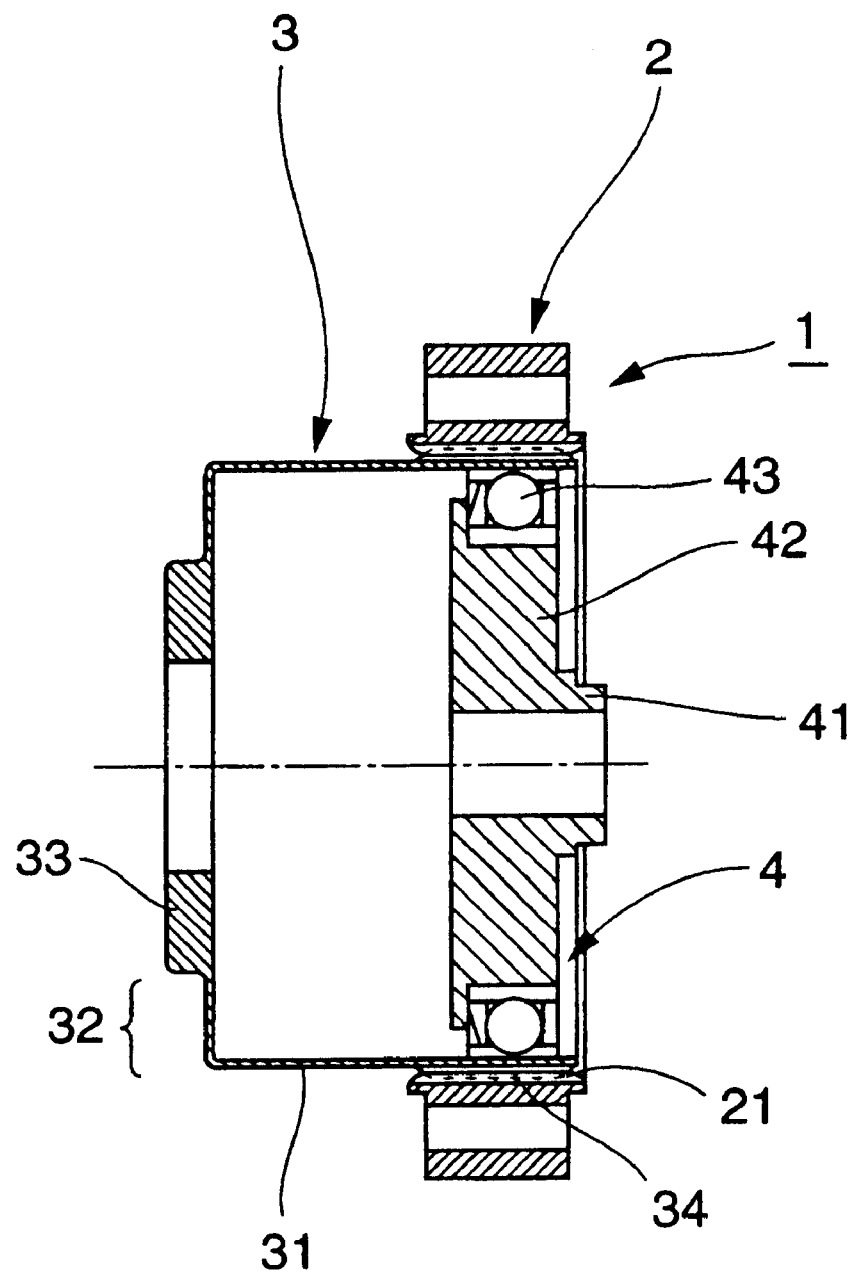
FIG. 1 is a longitudinal sectional view of a cup-shaped wave gear drive to which the present invention is applied.
Figure 2:
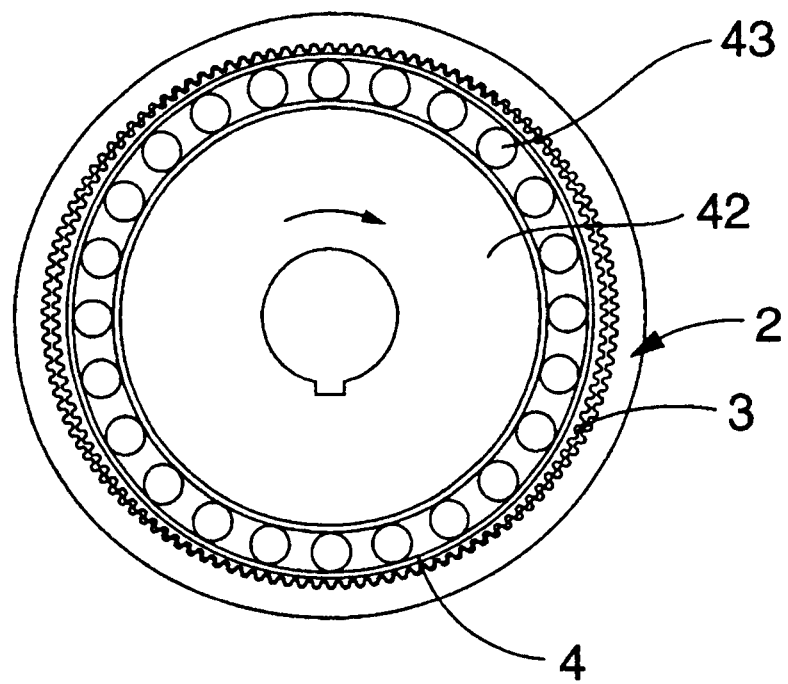
FIG. 2 is a front view of the wave gear drive of FIG. 1.

FIGS. 1 and 2 are longitudinal sectional and front views, respectively, of an example of a cup-shaped wave gear drive according to the present invention. The cup-shaped wave gear drive 1 comprises a rigid, circular internal gear 2, a cup-shaped flexible external gear 3 disposed inside the internal gear 2, and a rigid, elliptical wave generator 4 disposed inside the external gear 3.

The cup-shaped external gear 3 includes a cylindrical body 31, a circular diaphragm 32 extending radially from the opening at one end of the body 31, an annular boss 33 formed integrally with the inside edge of the diaphragm 32, and external teeth 34 formed on the outer periphery around the opening at the other end of the body 31. The external teeth 34 can engage with internal teeth 21 of the internal gear 2. The wave generator 4 comprises a circular hub 41, a rigid, elliptical cam plate 42 formed integrally on the outer peripheral surface of the hub 41, and a wave bearing 43 on the outer peripheral surface of the rigid cam plate 42.

The wave generator 4 flexes the toothed portion of the external gear 3 into an elliptical shape, pushing the portion of the external teeth located at each end of the elliptical major-axis into engagement with the corresponding teeth 21 of the internal gear 2. When the wave generator is rotated by a motor, the positions at which the two gears 2 and 3 mesh move around the circumference, generating a relative rotation produced by the difference in the number of teeth. Generally, the difference in the number of teeth in the two gears 2 and 3 is two teeth. The internal gear 2 is attached to a drive housing, and the rotational output from the motor is taken off the external gear 3, with the rotational speed being greatly reduced by the difference in the number of teeth.

In the cup-shaped wave gear drive 1, the wave generator hub 41 and rigid cam plate 42 are formed as a single component, of titanium alloy. The wave generator 4 accounts for more than half the weight of the wave gear drive 1, so using titanium alloy for those parts enables the weight of the wave gear drive 1 to be greatly reduced. Also, compared to aluminum alloy, a wave generator formed using titanium alloy is much more strong and durable.

Figure 3B:
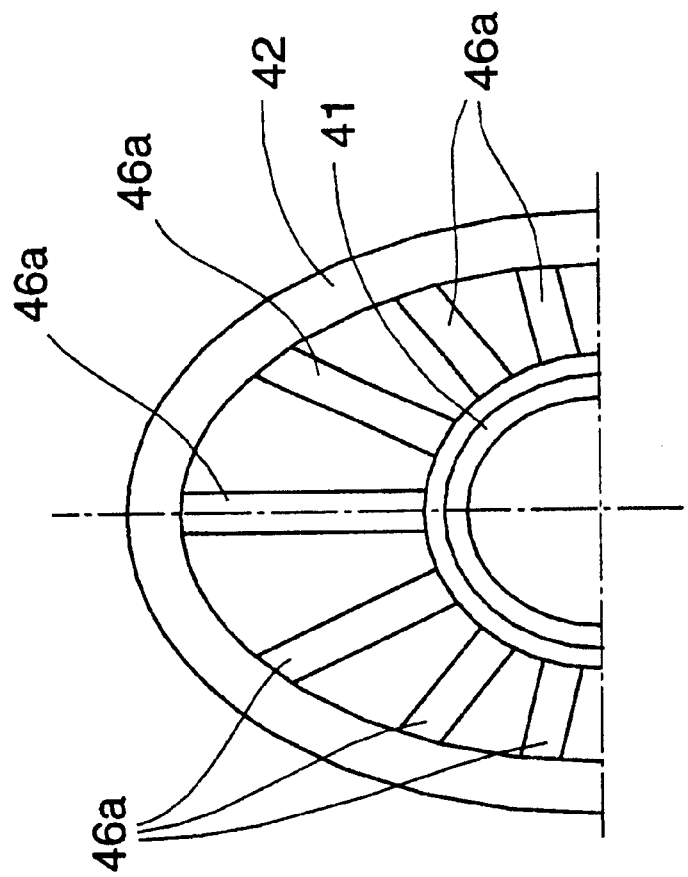
FIGS. 3A and 3B, respectively, are a partial sectional view and partial front view of parts of the rigid cam plate and hub of the wave generator in the wave gear drive of FIG. 1.
Figure 3A:
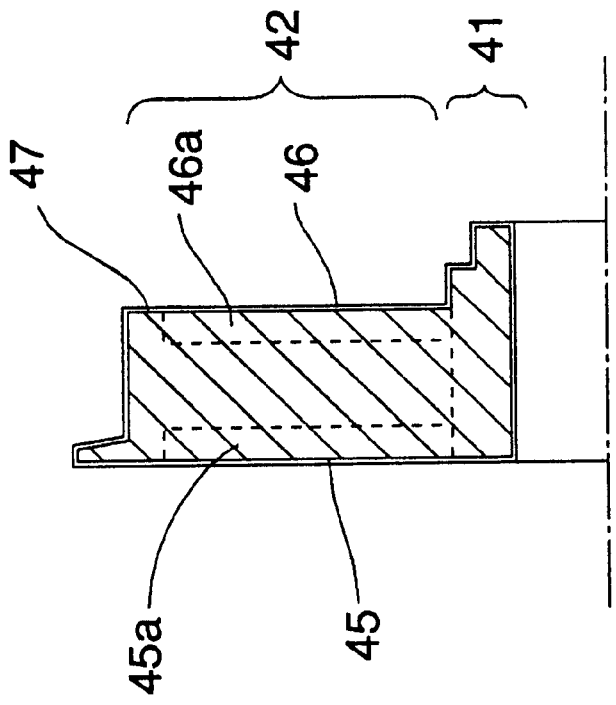

As shown in FIGS. 3A and 3B, the side surfaces 45 and 46 of the rigid cam plate 42 are constituted as heat-radiating surfaces by heat-dissipating fins 45a and 46a disposed to extend radially at equal angular intervals. The surface of the single component comprising the hub 41 and rigid cam plate 42 has a copper plating 47 with a thickness ranging from five to fifty micrometers. The plating 47 can be of any material that has a higher coefficient of thermal conductivity than that of titanium alloy. The surface of the hub 41 and rigid cam plate 42 is shot-peened to increase the surface area, and is then given the copper plating 47.

Since in the wave gear drive 1 the hub 41 and rigid cam plate 42 of the wave generator 4 are formed of titanium alloy, the weight of the wave gear drive is reduced. The heat-dissipating fins 45a and 46a are formed on the sides 45 and 46 of the rigid cam plate 42, and the surfaces are also given a copper plating 47, improving the heat-dissipating properties of the titanium alloy rigid cam plate 42 and making it possible to prevent overheating of this part.

Table 1 shows the thermal conductivity and other properties of the titanium alloy and copper used, in comparison with those of aluminum alloy.

TABLE 1

|  | Titanium alloy (Ti-6Al-4V) | Aluminum alloy (75S-T6) | Cu |
|---|---|---|---|
| Young's modulus (kgf/mm$^2$) | 11550 | 7280 | 11900 |
| Poisson ratio | 0.3–0.33 | 0.33 | 0.34 |
| Coefficient of linear expansion (× 10$^{-6}$/C) | 8.9 | 23.1 | 16.8 |
| Thermal conductivity (cal/cm$^2$/s/C/cm) | 0.0177 | 0.294 | 0.923 |
| Specific heat | 0.135 | 0.23 | 0.09 |

TABLE 1-continued

|  | Titanium alloy (Ti-6Al-4V) | Aluminum alloy (75S-T6) | Cu |
|---|---|---|---|
| (cal/g/C) Hardness (Hv) | 290–360 | 160 | 150–220 |

The above embodiment is an example of the invention applied to a cup-shaped wave gear drive. The external gear of the invention can also be applied to a top-hat-shaped wave gear drive. The top-hat-shaped external gear includes a cylindrical body, an annular diaphragm formed radially as an integral part at one end of the body, and a thick boss formed as an integral continuation of the outer edge of the diaphragm.

The heat-dissipating surface of the wave generator is not limited to the surface described with reference to the above embodiment, and may have a different structure.

In accordance with the invention described in the foregoing, parts of the wave generator, which accounts for more than half the weight of the wave gear drive and is also the hottest part, are formed of light titanium alloy and are also provided with surface fins to dissipate the heat. As a result, it is possible to achieve a lightweight wave gear drive having a wave generator that uses titanium alloy and also has good heat-dissipating properties.

What is claimed is:

1. A lightweight wave gear drive comprising a rigid, circular internal gear, a flexible, circular external gear, and a wave generator that radially flexes the external gear into partial engagement with the internal gear and moves the position of engagement of the two gears in a circumferential direction;

the wave generator including a circular hub, a rigid cam plate formed around an outer periphery of the hub, and a wave bearing provided between an outer peripheral surface of the rigid cam plate and an inner peripheral surface of the external gear;

wherein, of the hub and the rigid cam plate, at least the rigid cam plate is formed of titanium alloy; and at least a portion of two sides of the rigid cam plate is formed as a crenellated heat-dissipating surface.

2. The wave gear drive according to claim 1, wherein the heat-dissipating surface is a surface having radial heat-dissipating fins formed thereon.

3. The wave gear drive according to claim 1, wherein the hub and the rigid cam plate are formed as a single component of titanium alloy.

4. The wave gear drive according to claim 1, wherein the surface of the rigid cam plate has a surface plating of a heat-dissipating material having a higher coefficient of thermal conductivity than that of titanium alloy.

5. The wave gear drive according to claim 4, wherein the surface plating has a thickness within a range of from five to fifty micrometers.

6. The wave gear drive according to claim 4, wherein the surface of the rigid cam plate that is to be plated is first subjected to surface hardening treatment by shot peening.

* * * * *